US008564812B2

(12) United States Patent
Machiyama (10) Patent No.: US 8,564,812 B2
(45) Date of Patent: Oct. 22, 2013

(54) APPARATUS AND METHOD FOR GENERATING A COMMUNICATION MANAGEMENT REPORT WITH SECURITY FUNCTION (75) Inventor: Kenichi Machiyama, Tokyo (JP)

(73) Assignee: Oki Data Corporation, Tokyo (JP)

( * ) Notice: Subject to any disclaimer, the term of this patent is extended or adjusted under 35 U.S.C. 154(b) by 790 days.

(21) Appl. No.: 12/461,880

(22) Filed: Aug. 27, 2009

(65) Prior Publication Data

US 2010/0053692 A1    Mar. 4, 2010

(30) Foreign Application Priority Data

Sep. 3, 2008   (JP) ................................ 2008-225368

(51) Int. Cl.
*G06F 3/12*    (2006.01)
(52) U.S. Cl.
USPC ........... 358/1.15; 358/1.13; 358/1.1; 358/1.9; 358/402; 358/407; 379/100.08; 379/100.01; 379/88.22
(58) Field of Classification Search
None
See application file for complete search history.

(56) References Cited

U.S. PATENT DOCUMENTS

2004/0187092 A1*   9/2004  Fujiwara ........................ 717/106
2005/0237569 A1*  10/2005  Takahashi ..................... 358/1.15
2008/0084576 A1*   4/2008  Dantwala ...................... 358/1.15

FOREIGN PATENT DOCUMENTS

| JP | A-2005-27139  | 1/2005  |
| JP | A-2005-94414  | 4/2005  |
| JP | A-2005-311934 | 11/2005 |
| JP | A-2005-340932 | 12/2005 |

* cited by examiner

*Primary Examiner* — Paul F Payer
(74) *Attorney, Agent, or Firm* — Muncy, Geissler, Olds & Lowe, PLLC (57) ABSTRACT A communication terminal apparatus comprises: a communication history information part storing a communication history related to at least one of destination information of a receiver and destination information of a sender; a user information part storing user information corresponding to a plurality of users; a security function setting part enabling whether or not the destination information is outputted in a communication management report; and an output part configured to output the communication management report containing a plurality of communication histories of the users based on an output instruction by a first user, wherein when the security function setting part is in a state that the destination information is not outputted, the communication management report does not contain the destination information that does not correspond to the communication history of the first user.

11 Claims, 11 Drawing Sheets

| Parameter | Setting Value |
|---|---|
| ....... | ....... |
| View Destination Information | ON |
| ....... | ....... |
| Security Mode | Enable |
| ....... | ....... |

109

115 /*Destination Information Output Setting, ON: Display OFF: No display

114 /*Security Function Setting, ENABLE: DISABLE:*/

Fig. 3

| Comm. number 125 | User ID 126 | Receiver's name 127 | Destination 128 | Type 129 | Starting date and time 130 | Comm. time (second) 131 | Number of transmitting page 132 | Number of receiving page 133 | Comm. result 134 |
|---|---|---|---|---|---|---|---|---|---|
| 1 | ab012345 | A Co. | 012-345-6789 | FAX-TX | 2008.06.17 12:30 | 60 | 20 | | OK |
| 2 | | B Co. | 023-456-7890 | FAX-RX | 2008.06.17 13:00 | 35 | | 10 | MEM.OVER (After page 11) |
| 3 | ab345678 | C Corp. | dareka@c-syouji.com | MAIL | 2008.06.17 16:00 | 5 | 1 | | OK |
| ..... | ..... | ..... | ..... | ..... | ..... | ..... | ..... | ..... | ..... |
| 12 | bc567890 | D Inc. | 222-333-4444 | FAX-TX | 2008.06.17 18:00 | 15 | 10 | | OK |
| .. | .. | .. | .. | .. | .. | .. | .. | .. | .. |
| 24 | bc567890 | E store | 999-888-1234 | FAX-TX | 2008.06.17 19:30 | 5 | 3 | | OK |
| .. | .. | .. | .. | .. | .. | .. | .. | .. | .. |
| 36 | ab345678 | File server | 192.168.0.23 | SERVER | 2008.06.17 21:00 | 15 | 3 | | OK |
| ..... | ..... | ..... | ..... | ..... | ..... | ..... | ..... | ..... | ..... |
| 99 | zz012345 | Mr. G | gsan@zsya.com | MAIL | 2008.06.18 03:00 | 20 | 3 | | NG |

| User Number | User ID | Password |
|---|---|---|
| 1 | ab012345 | 0000 |
| 2 | ab345678 | 0102 |
| 3 | bc567890 | 3040 |
| ...... | ...... | ...... |
| 99 | zz012345 | 9099 |

Communication Management Report

| | | | | | 2008.06.20 MFP100 | |
|---|---|---|---|---|---|---|
| Type | Receiver's name | Destination | User ID | Number of pages | Date | Time | Comm. time (second) | Comm. result |
| FAX-TX | | | ab012345 | 20 | 2008.06.17 | 12:30 | 60 | OK |
| FAX-RX | | | ab345678 | 10 | 2008 06.17 | 13:00 | 35 | MEM.OVER |
| MAIL | | | bc567890 | 1 | 2008 06.17 | 16:00 | 5 | OK |
| ... | | | ... | ... | ... | ... | ... | ... |
| FAX-TX | | | bc567890 | 10 | 2008 06.17 | 18:00 | 15 | OK |
| ... | | | ... | ... | ... | ... | ... | ... |
| FAX-TX | | | bc567890 | 3 | 2008 06.17 | 19:30 | 5 | OK |
| SERVER | | | ab345678 | 3 | 2008 06.17 | 21:00 | 15 | OK |
| ... | | | ... | ... | ... | ... | ... | ... |
| MAIL | | | zz012345 | 3 | 2008 06.18 | 03:00 | 20 | NG |

Non-display

Fig. 7

Communication Management report 2008.06.20
MFP100

| Type | Receiver's name | Destination | User ID | Number of pages | Date | Time | Comm. time (second) | Comm. result |
|---|---|---|---|---|---|---|---|---|
| FAX-TX | A Cc. | 012-345-6789 | ab012345 | 20 | 2008.06.17 | 12:30 | 60 | OK |
| FAX-RX | B Co. | 023-456-7890 | | 10 | 2008 06.17 | 13:00 | 35 | MEM.OVER |
| MAIL | C Corp. | dareka@c-syouji.com | ab345678 | 1 | 2008 06.17 | 16:00 | 5 | OK |
| ... | ... | ... | ... | ... | ... | ... | ... | ... |
| FAX-TX | D Inc. | 222-333-4444 | bc567890 | 10 | 2008 06.17 | 18:00 | 15 | OK |
| ... | ... | ... | ... | ... | ... | ... | ... | ... |
| FAX-TX | E store | 999-888-1234 | bc567890 | 3 | 2008 06.17 | 19:30 | 5 | OK |
| SERVER | File server | 192.168.0.23 | ab345678 | 3 | 2008 06.17 | 21:00 | 15 | OK |
| ... | ... | ... | ... | ... | ... | ... | ... | ... |
| MAIL | Mr. G | gsan@zsya.com | zz012345 | 3 | 2008 06.18 | 03:00 | 20 | NG |

Fig. 8

Communication Management report

2008.06.20
MFP100

| Type | Receiver's name | Destination | User ID | Number of pages | Date | Time | Comm. time (second) | Comm. result |
|---|---|---|---|---|---|---|---|---|
| FAX-TX | | | ab012345 | 20 | 2008.06.17 | 12:30 | 60 | OK |
| FAX-RX | | | ab345678 | 10 | 2008.06.17 | 13:00 | 35 | MEM.OVER |
| MAIL | | | bc567890 | 1 | 2008.06.17 | 16:00 | 5 | OK |
| ... | ... | ... | ... | ... | ... | ... | ... | ... |
| FAX-TX | D Inc. | 222-333-4444 | bc567890 | 10 | 2008.06.17 | 18:00 | 15 | OK |
| ... | ... | ... | ... | ... | ... | ... | ... | ... |
| FAX-TX | E store | 999-888-1234 | bc567890 | 3 | 2008.06.17 | 19:30 | 5 | OK |
| SERVER | | | ab345678 | 3 | 2008.06.17 | 21:00 | 15 | OK |
| ... | ... | ... | ... | ... | ... | ... | ... | ... |
| MAIL | | | zz012345 | 3 | 2008.06.18 | 03:00 | 20 | NG |

Display destination information with respect to user ID "bc567890"

APPARATUS AND METHOD FOR GENERATING A COMMUNICATION MANAGEMENT REPORT WITH SECURITY FUNCTION

CROSS REFERENCE TO RELATED APPLICATION

The present application is related to, claims priority from and incorporates by reference Japanese Patent Application No. 2008-225368, filed on Sep. 3, 2008.

TECHNICAL FIELD

The present application is related to a communication terminal apparatus.

DESCRIPTION OF RELATED ART

A conventional facsimile machine manages a communication history and has a function to output a communication management report according to a user's request. Japanese laid-open patent application No. 2005-340932 discloses an easy method to identify a manuscript that is re-transmitted in the case of a transmission error by describing subject information related to transmitted image data to a communication history in a data communication apparatus managing the communication history.

In the data communication apparatus described above, destination information, such as receiver's name and facsimile number, is printed in a communication management report. When a third person outputs the communication management report, destination information, such as receiver's name, and facsimile number, are leaked to the third person. Therefore, the data communication apparatus described above has a security problem.

The present application has the following structure to solve the problem described above.

A communication terminal apparatus is provided, comprising: a communication history information part configured to store a communication history related to at least one of destination information of a receiver and destination information of a sender; a user information part configured to store user information corresponding to a plurality of users who can operate the communication terminal apparatus; a security function setting part configured to enable whether or not the destination information is outputted in a communication management report; and an output part configured to output the communication management report containing a plurality of communication histories of the plurality of users based on an output instruction by a first user from the plurality of users, wherein when the security function setting part is in a state that the destination information is not outputted, the communication management report does not contain the destination information that does not correspond to the communication history of the first user.

A method of operating a communication terminal apparatus is provided, comprising: receiving a request for outputting a communication management report including communication history information relating to one or more data communications, the communication history information including destination information relating to a receiver's name and a destination identifier for each of the one or more data communications; determining based on a destination information output setting whether some of a set of the destination information will be included in the communication management report; determining based on a security function setting what portion of the set of destination information will be included in the communication management report if some of the set of destination information will be included in the communication management report; acquiring some or all of the communication history information from a memory element, including any portion of the destination information that has been determined to be included in the communication management report; generating the communication management report based on the acquired communication history information; and outputting the communication management report using an output part.

A multifunction peripheral device is provided, comprising: a central processing unit configured to control operation of the multifunction peripheral device; a non-volatile read/write memory configured to store communication history information, user information, and security function information; and an output part configured to output a communication management report including at least part of the communication history information; wherein the communication history information relates to one or more previous communications between the multifunction peripheral device and a one or more remote devices, including a destination identifier, a receiver's name, and a sender's identifier for each of the one or more previous communications, wherein the user information corresponds to a plurality of users who can operate the multifunction peripheral device, and wherein the security function information identifies whether and under what circumstances the destination identifier and the receiver's name associated with each of the one or more previous communications will be outputted in the communication management report.

According to the present application, since a user can print only destination information in a communication history that the user, who logs in, transmitted, it is possible to prevent a third person from printing destination information, which should not be leaked to the third person, when the third person outputs a communication management report. When a user logged in refers the communication management report and finds a transmission error in transmitted several manuscripts, the user can identify the manuscript that is re-transmitted.

DETAILED DESCRIPTION

An embodiment of the present application is explained below. A multifunction peripheral (MFP) as an application of a communication terminal apparatus is explained.

First Disclosed Embodiment

Figure 1:
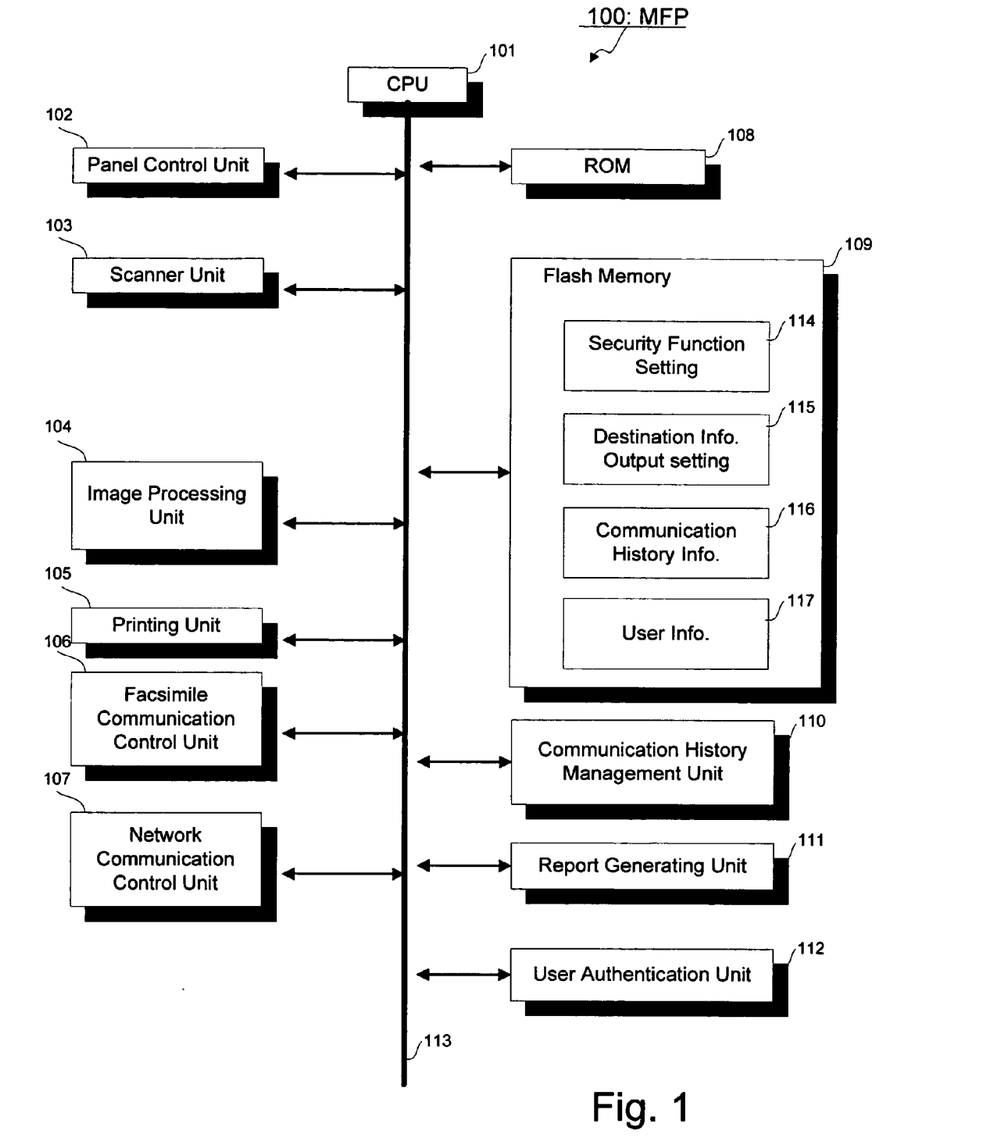
FIG. 1 is a functional block diagram of a multifunction peripheral (MFP) according to a first disclosed embodiment.

FIG. 1 is a functional block diagram of an MFP according to the first disclosed embodiment. An MFP 100 includes a CPU 101, a panel control unit 102, a scanner unit 103, an image processing unit 104, a printing unit 105, a facsimile communication control unit 106, a network communication control unit 107, a read only memory (ROM) 108, a flash memory 109, a communication history management unit 110, a report generating unit 111, a user authentication unit 112, and a system bus 113.

The CPU 101 is a micro computer and realizes each function of the MFP 100 through executing control programs stored in the ROM 108. The CPU 101 connects each unit that is controlled by the CPU 101 through the system bus 113 and does overall control over each unit according to a function.

Figure 2:
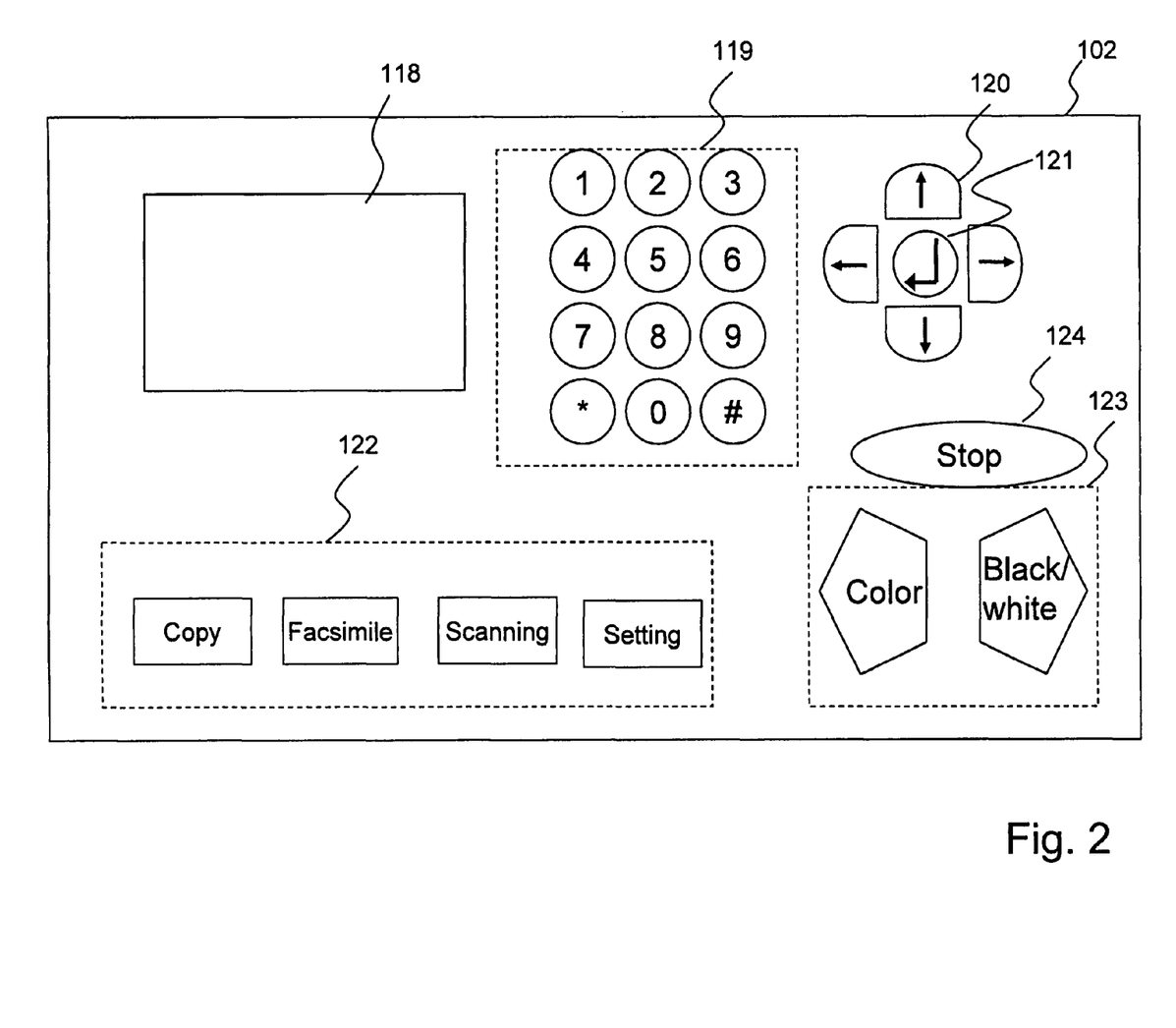
FIG. 2 is an explanatory diagram of a panel control unit of an MFP according to a first disclosed embodiment.

The panel control unit 102 functions as a man-machine interface between a user and the MFP 100. FIG. 2 is an explanatory diagram of a panel control unit of an MFP according to the first disclosed embodiment. As shown in FIG. 2, the panel control unit 102 includes a display 118 for displaying setting items and a status of the MFP 100, a numeric keypad 119 for inputting letters and numbers, a cursor keypad 120 and an enter key 121 that are used for several kinds of operation settings, and mode changing buttons 122 for changing each of function screens and setting screens. The panel control unit 102 further includes a start button 123 for executing each function of the MFP 100, and a stop button 124 for halting an operation being executed.

Returning to an explanation of FIG. 1, the scanner unit 103 converts a manuscript that is sent by a facsimile or a manuscript that is copied into printing data. Several well-known methods can be employed for the conversion into printing data. For example, after a target manuscript is placed on a glass platen, a contact line image sensor runs for reading, a charge-coupled device (CCD) image sensor runs for reading, or other methods.

The image processing unit 104 conducts the following image processing operation: making intermediate data by editing image data transmitted and received through a facsimile communication control unit 106 and a network communication control unit 107, or by editing image data created through scanning a manuscript in the scanner unit 103; and evolving the intermediate data and making raster data. The raster data is configured with position information and numeric value information.

The printing unit 105 operates as an output part and prints image data received by an external facsimile machine and so on, or image data read by the scanner unit 103 in case of copying on a recording paper, such as A4 and B4 size paper, that is held in the MFP 100.

The facsimile communication control unit 106 connects to a communication network, controls calling and receiving of a line, and transmits and receives image data to/from a facsimile machine and so on at another end.

The network communication control unit 107 controls, for example, transmitting and receiving mail and image data via a communication network (e.g., the Internet, a private mail network, etc.). This communication network can be a wired network, a wireless network, or a combination of a wireless and wired network in various embodiments.

The read only memory (ROM) 108 is a memory stored a certain control program for operation of the CPU 101 in order to control the MFP 100. The ROM 108 is a nonvolatile memory that holds memory contents even when the electric power for the MFP 100 is cut off.

The flash memory 109 is a re-writable memory and stores the following information: a security function setting 114, a destination information output setting 115, communication history information 116, and user information 117 that are set in the MFP 100 in advance. As with the ROM 108, the flash memory 109 is also a nonvolatile memory that holds memory contents even when the electric power of the MFP 100 is cut off.

The setting of information stored in the flash memory 109 will now be explained. The security function setting 114 is a Boolean variable that is set by an administrator of the MFP 100 in advance either in an enable state or in a disable state in order to control whether destination information is printed in a communication management report with respect to a communication history related to users other than an authenticated user who is currently using the MFP 100.

The destination information output setting 115 is a Boolean variable that is set in advance regarding whether or not to print by an administrator of the MFP 100 in order to control whether destination information is printed in a communication management report.

The communication history information 116 is a communication history related to transmitted and received print data through the facsimile communication control unit 106 and the network communication control unit 107. The communication history is written into the communication history information 116 by the communication history management unit 110.

The user information 117 is information showing an authentication registered user for using the MFP 100. The user information 117 is configured with a user number, a user ID, and a password.

The communication history management unit 110 writes/reads transmitted and received print data through the facsimile communication control unit 106 and the network communication control unit 107 into/from the communication history information 116 in the flash memory 109.

The report generating unit 111 receives a communication history from the communication history management unit 110 and generates print data for a communication management report when the communication management report is outputted by a request from a user. The user authentication unit 112 authenticates a user who uses the MFP 100 based on the user information 117 stored in the flash memory 109 and authentication information received from the user.

Figure 3:
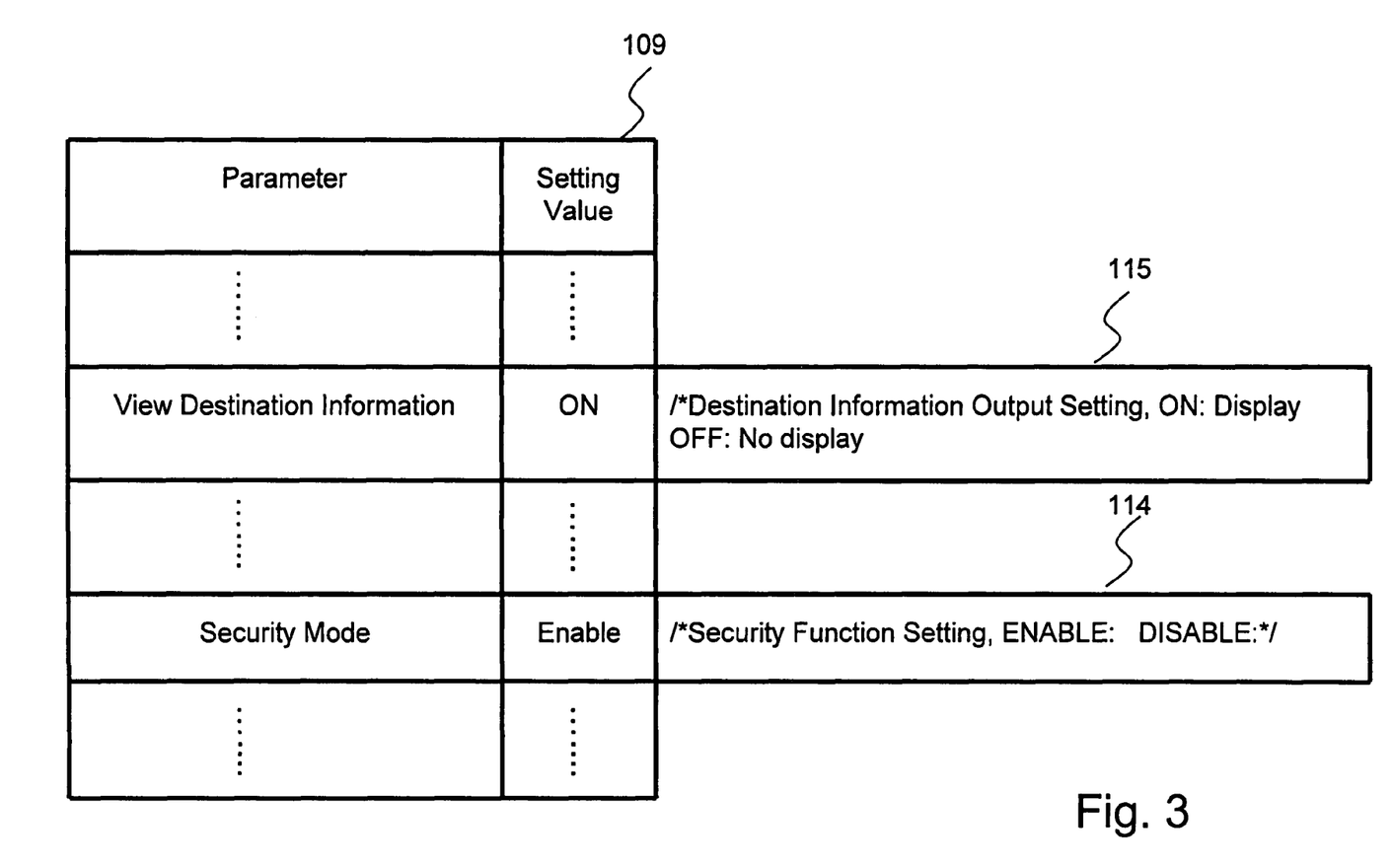
FIG. 3 is an explanatory diagram of a security function setting and a destination information output setting according to a first disclosed embodiment.

Settings of a security function and destination information output with respect to a communication management report according to the first disclosed embodiment is explained below. FIG. 3 is an explanatory diagram of a security function setting and a destination information output setting according to the first disclosed embodiment.

When a setting value of "VIEW DESTINATION INFORMATION" as a parameter is designated as ON/OFF, the destination information output setting is set with respect to whether or not destination information is printed in a communication management report.

When a setting value of "SECURITY MODE" as a parameter is designated as ENABLE/DISABLE, user authentication is set in either an enable state or a disable state. This setting is stored in the security function setting 114. In other words, this setting controls whether or not destination information is printed in the communication management report with respect to a communication history related to only a user who is currently using the MFP 100. However, when the setting value of "VIEW DESTINATION INFORMATION" is OFF, the destination information is not printed on the communication management report regardless of the setting of "SECURITY MODE."

Figure 4:
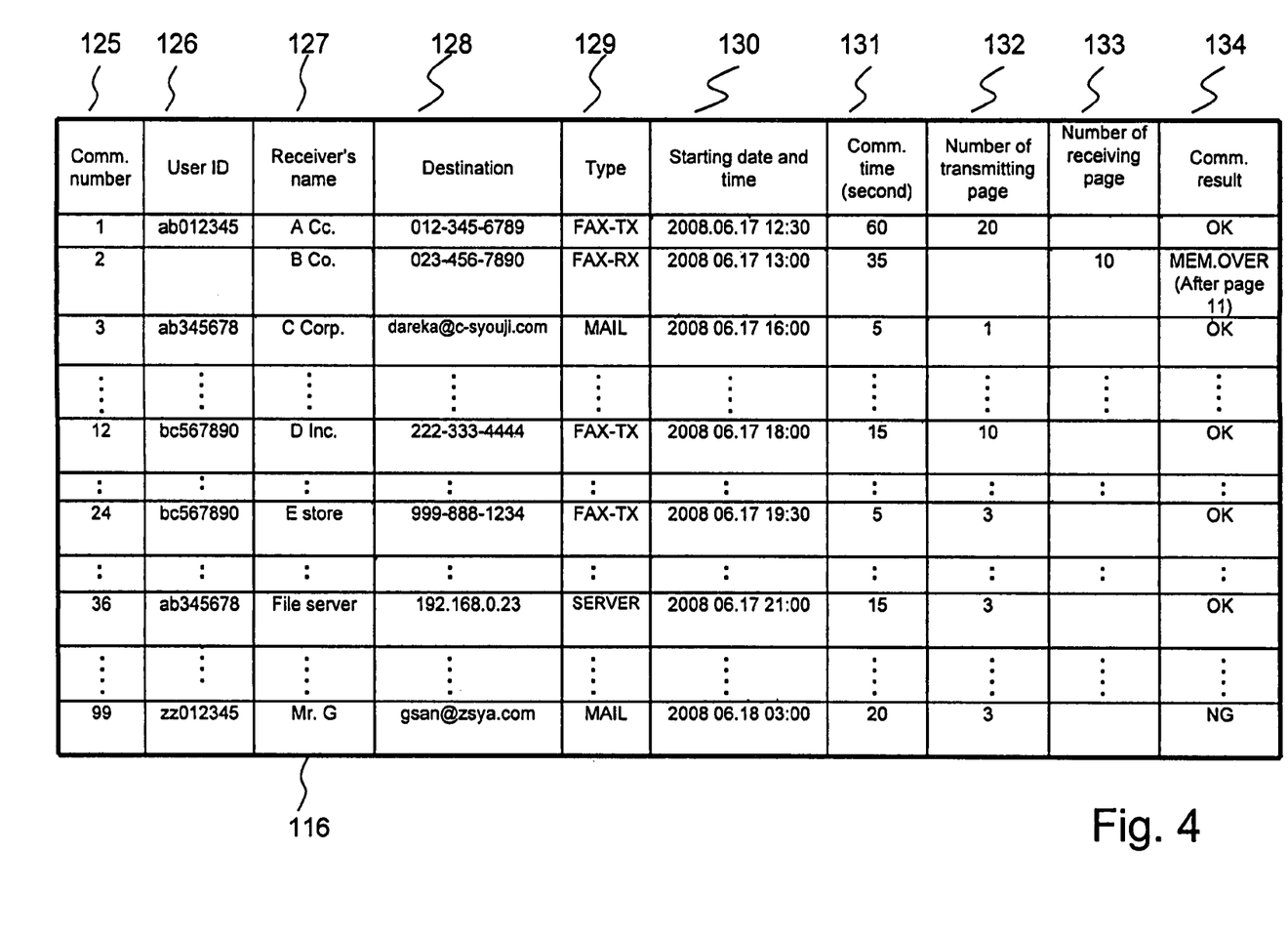
FIG. 4 is an explanatory diagram of communication history information according to a first disclosed embodiment.

Next, communication history information according to the first disclosed embodiment is explained below. FIG. 4 is an explanatory diagram of communication history information according to the first disclosed embodiment. As shown in FIG. 4, communication history information 116 is configured with the following items: a communication number 125, a user ID 126, a receiver's name 127, a destination 128, a type 129, a starting date and time 130, a communication time 131, a number of transmitting page 132, a number of receiving page 133, and a communication result 134.

The communication number 125 represents the order of a communication history in the past. The user ID 126 represents an identification (ID) of a user who transmits a document by facsimile or email using the MFP 100. The receiver's name 127 represents a name of a destination (sending) and a name of a sender (receiving). The destination 128 represents facsimile numbers, email addresses, and IP addresses of a server or computer of destinations as destination identifiers.

The type 129 represents a type of communication, for example, transmission by facsimile, receiving by facsimile, and sending by email. The starting date and time 130 represents a date and time when the communication starts. The communication time 131 represents the duration of the communication. The number of transmitting page 132 represents number of pages of a transmitted manuscript. The number of receiving page 133 represents number of pages of received data. The communication result 134 represents whether the communication successfully completes or is in error. If there was an error, the communication result 134 may also include information regarding what kind of error was encountered, e,g., memory over, no answer, etc.

Figure 5:
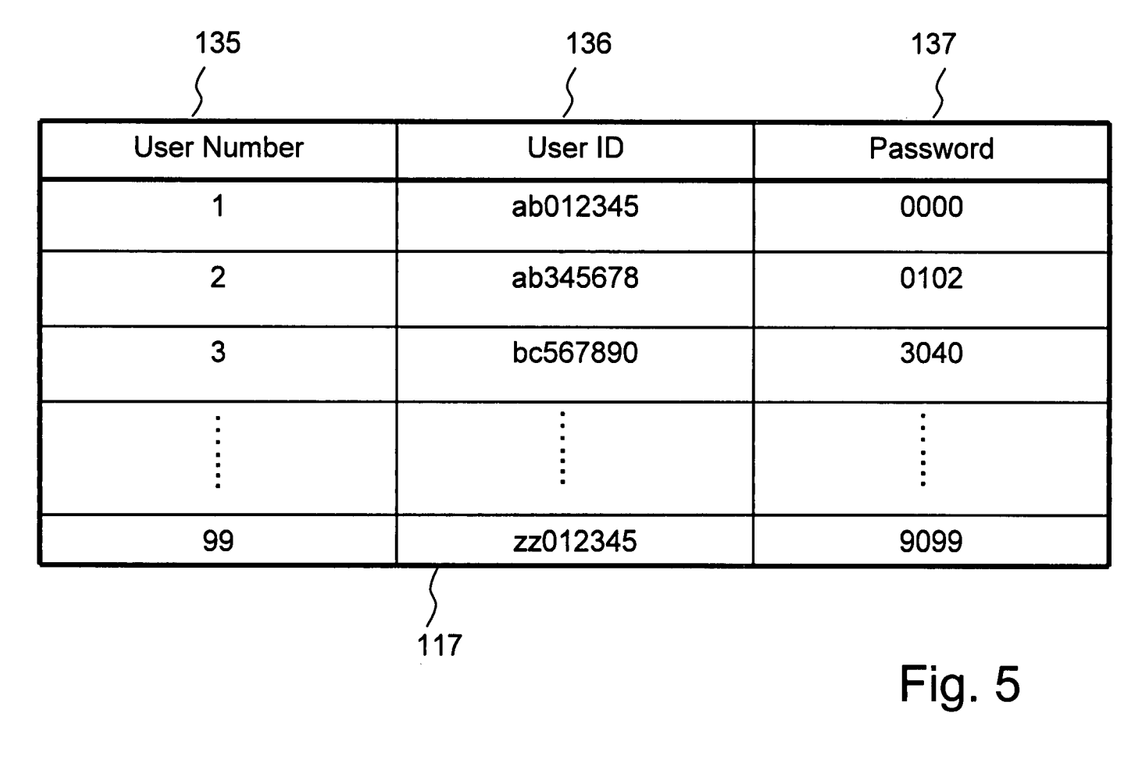
FIG. 5 is an explanatory diagram of user information according to a first disclosed embodiment.

User information according to the first disclosed embodiment is explained below. FIG. 5 is an explanatory diagram of user information. As shown in FIG. 5, the user information 117 is configured with a user number 135, a user ID 136, and a password 137.

The user number 135 represents unique number assigned to a user who is registered in advance for using the MFP 100. The user ID 136 represents an identification (ID) of a user who is registered. The password 137 represents a password for a registered user.

Figure 6:
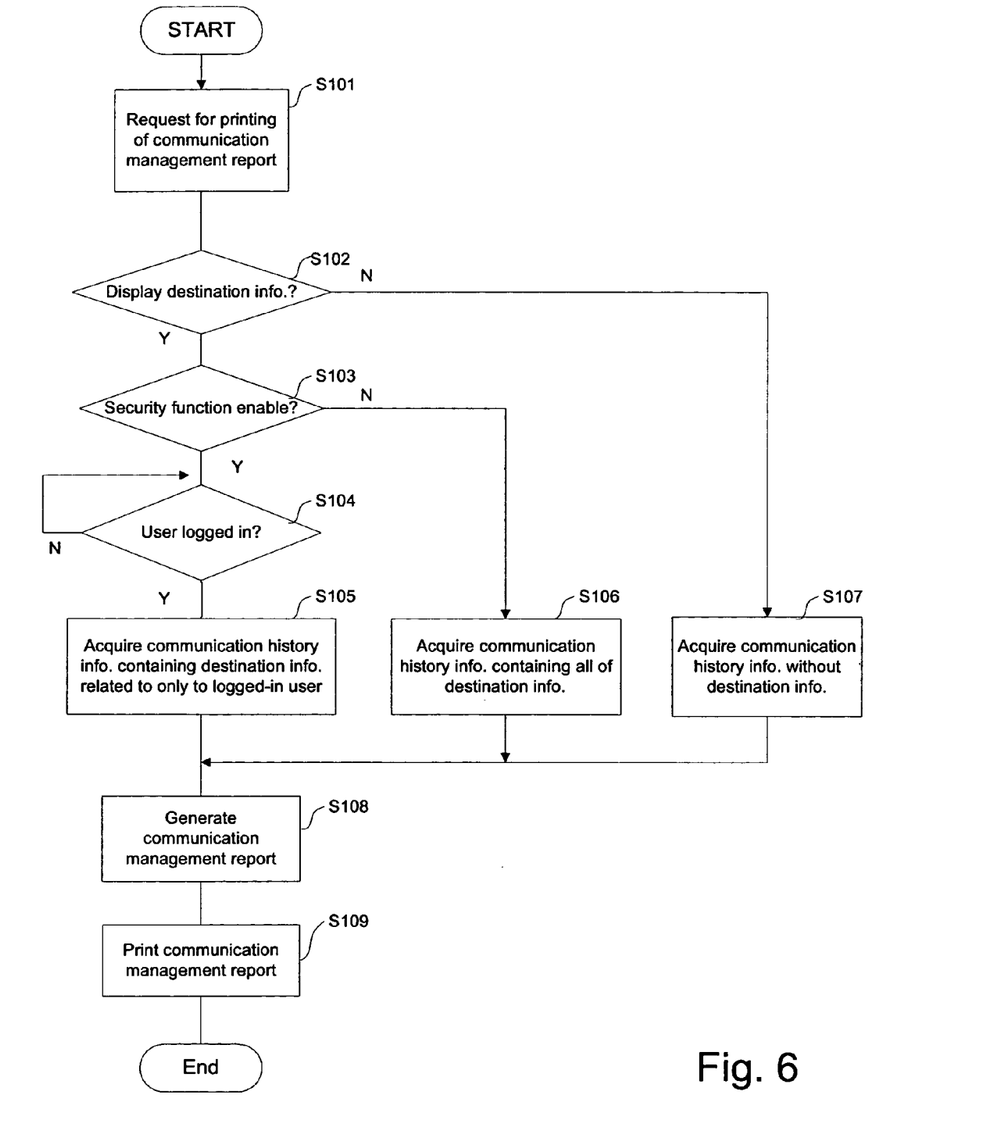
FIG. 6 is a flow diagram showing an operation of output of a communication management report according to a first disclosed embodiment.

Next, an operation of output of a communication management report for the MFP 100 according to the first disclosed embodiment is explained below. FIG. 6 is a flow diagram showing an operation of output of a communication management report according to the first disclosed embodiment.

An operation of the output of a communication management report is explained below in the order of steps S101 through S109 with reference to FIGS. 1 and 3.

(S101) In the MFP 100, the output of a communication management report starts when (i) a user requests to print the communication management report through the operating a panel control unit 102, or (ii) the number of a communication in a communication history exceeds a predetermined number, which triggers the system to print the communication management report automatically after a user completes a facsimile transmission. When a user does not log in while using the MFP 100 before the user prints the communication management report, the user is requested to log in by a CPU 101 through the panel control unit 102.

(S102) The CPU 101 instructs the system to read a destination information output setting 115 from the flash memory 109. When a state of the destination information output setting 115 is ON (i.e., all of the destination information is to be printed in the communication management report), an operation goes to S103. When a state of the destination information output setting 115 is OFF (i.e., all of the destination information is to be not printed in the communication management report), an operation goes to S107.

(S103) The CPU 101 instructs the system to read a destination information output setting 115 from the flash memory 109. When a state of the destination information output setting 115 is ON, the CPU 101 instructs the system to read a security function setting 114 from the flash memory 109. When a state of the security function setting 114 is ENABLE, an operation goes to S104. When a state of the security function setting 114 is DISABLE, an operation goes to S106.

(S104) When the security function setting 114 in the flash memory 109 is ENABLE, the CPU 101 instructs the system to determine whether or not an authenticated user of the MFP 100 already logged in by authenticating the user's identity. When the authenticated user is logged in, an operation goes to S105. When an authenticated user is not logged in, operation returns to S104 until an authenticated user is logged in. Although not shown, the operation may exit after a wait time if no authenticated user logs in before the wait time expires.

(S105) When the authenticated user of the MFP 100 logged in, the CPU 101 instructs a communication history management unit 110 to acquire the communication history information 116 containing a receiver's name 127 and a destination 128, which corresponds the communication history that the logged-in user transmitted, and communication history information 116 not containing a receiver's name 127 and a destination 128, which corresponds the communication history that a user other than the logged-in user transmitted, from the flash memory 109.

(S106) In the S103, when the security function setting 114 is DISABLE, the CPU 101 instructs the communication history management unit 110 to acquire all of the communication history information 116 contained a receiver's name 127 and a destination 128 from the flash memory 109.

(S107) In the S102, when the destination information output setting 115 is OFF, the CPU 101 instructs the communication history management unit 110 to acquire the communication history information 116 that does not contain a receiver's name 127 and a destination 128 from the flash memory 109.

(S108) After receiving the relevant communication history information from the flash memory 109 in one of S105, S106, or S107, the communication history management unit 110 transfers the communication history information 116 acquired from the flash memory 109 to the report generating unit 111. The report generating unit 111 generates data for a communication management report based on the information received.

(S109) After the data for the communication management report is generated, the report generating unit 111 transfers the data to the printing unit 105. The printing unit 105 receiving the data then prints the communication management report based on the data.

Figure 7:
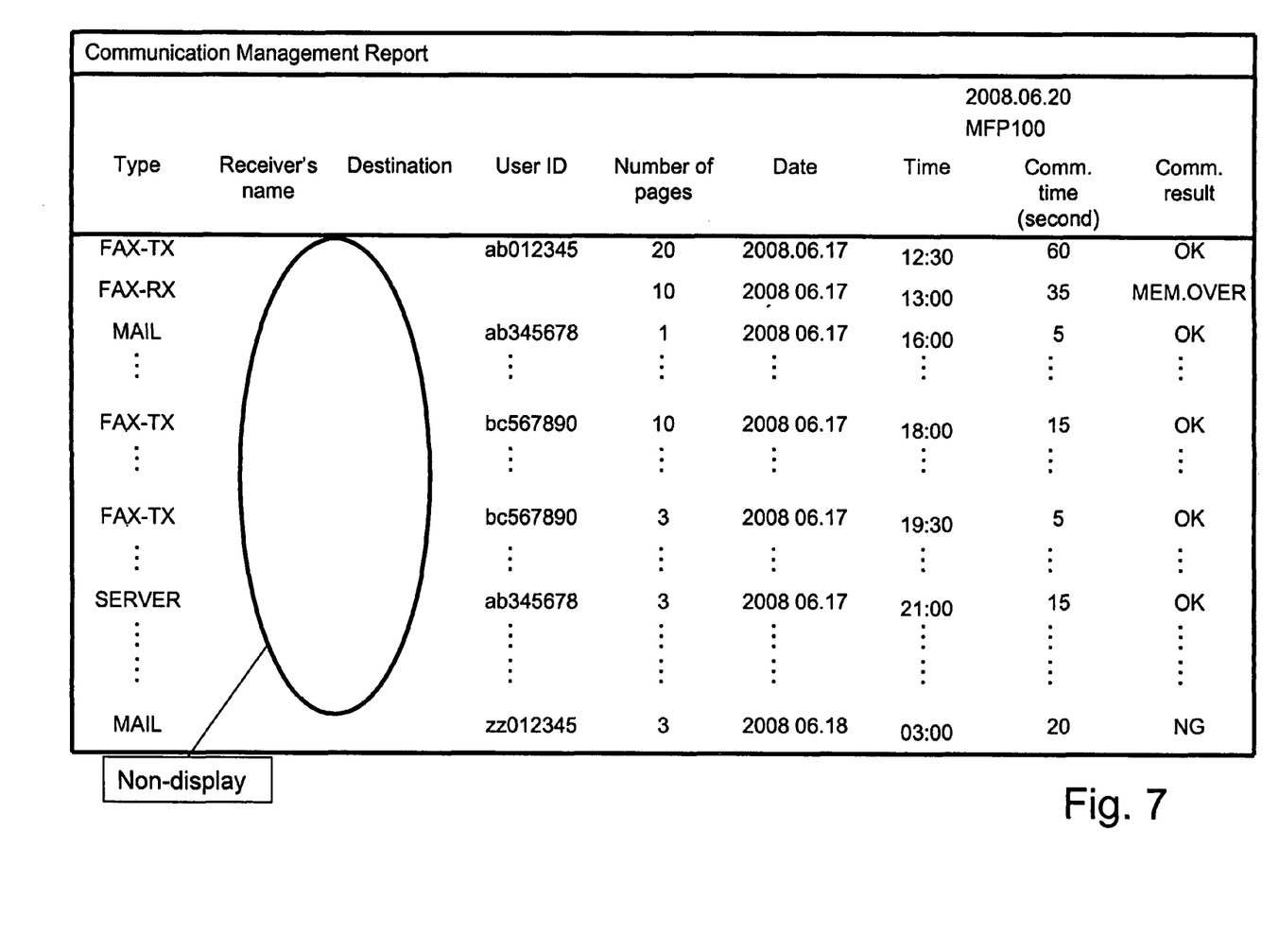
FIG. 7 is an explanatory diagram of a communication management report in a destination information non-printing mode according to a first disclosed embodiment.

Each communication management report generated in the first disclosed embodiment is explained below. FIG. 7 is an explanatory diagram of a communication management report in a destination information non-printing mode according to the first disclosed embodiment. As shown in FIG. 7, a receiver's name 127 and a destination 128 are blank and other items are printed in the communication management report. This corresponds to an exemplary embodiment in which the destination information output setting 115 is OFF, meaning that the operation of FIG. 6 passes through S107.

Figure 8:
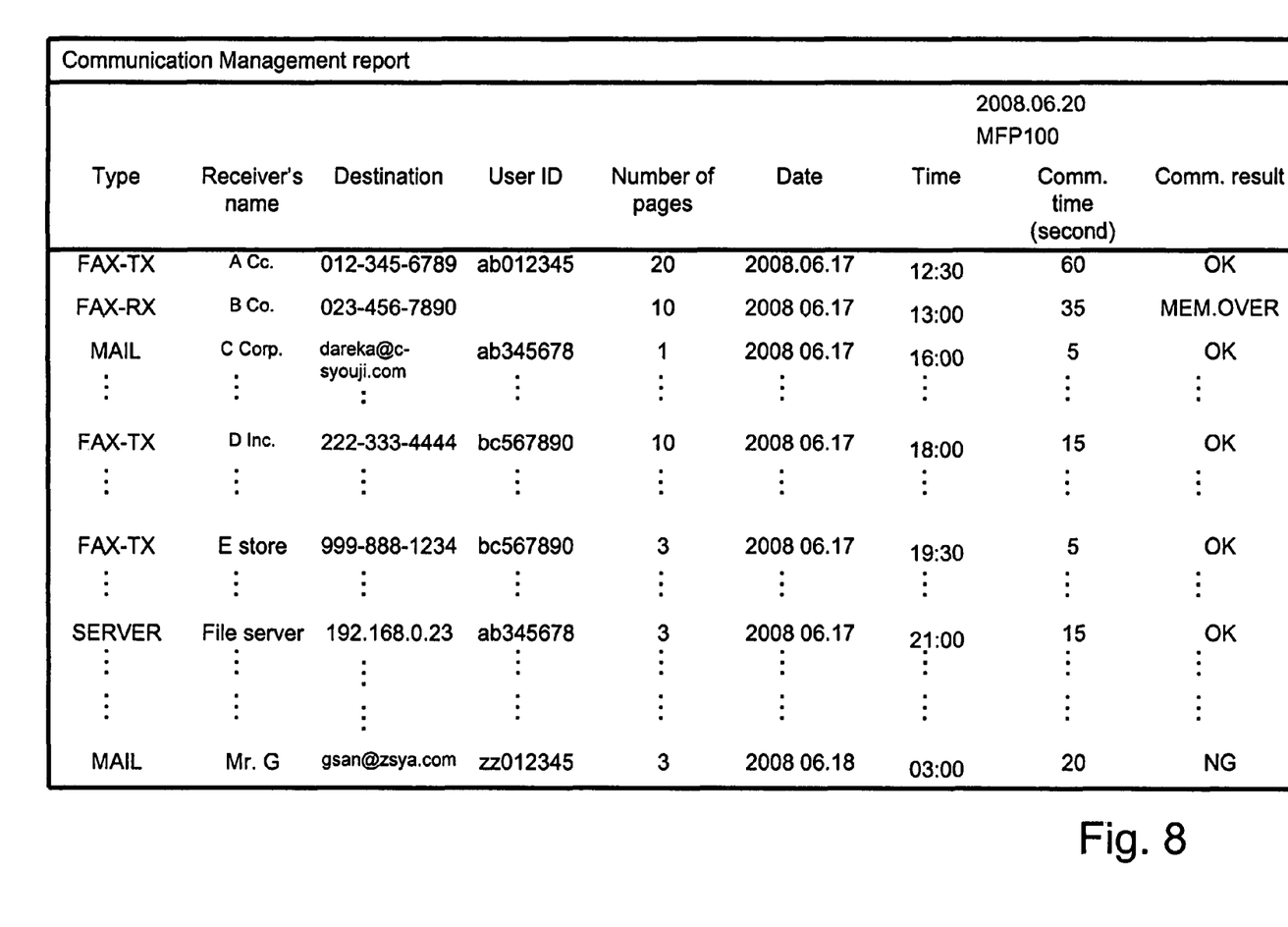
FIG. 8 is an explanatory diagram of a communication management report in a destination information printing and security function invalidity mode according to a first disclosed embodiment.

FIG. 8 is an explanatory diagram of a communication management report in a destination information printing and security function invalidity mode according to the first disclosed embodiment. As shown in FIG. 8, the receiver's name 127 and the destination 128 are printed in the communication management report. This corresponds to an exemplary embodiment in which the destination information output setting 115 is ON and the security function setting 114 is DISABLE, meaning that the operation of FIG. 6 passes through S106.

Figure 9:
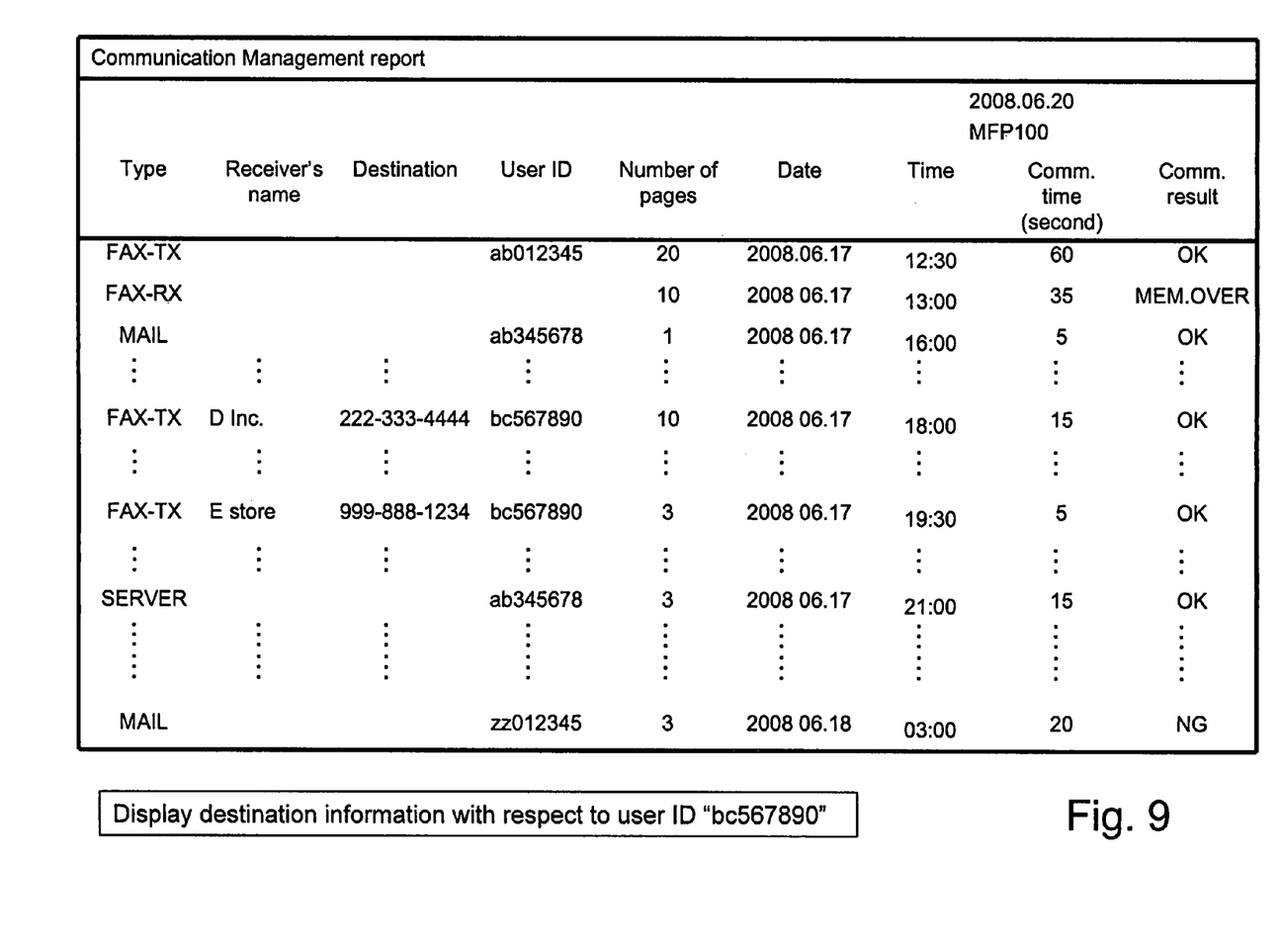
FIG. 9 is an explanatory diagram of a communication management report in a destination information printing and security function validity mode according to a first disclosed embodiment.

FIG. 9 is an explanatory diagram of a communication management report in a destination information printing and security function validity mode according to the first disclosed embodiment. As shown in FIG. 9, the receiver's name 127 and the destination 128 in the communication management report are printed with respect to only a user ID "bc567890." This corresponds to an exemplary embodiment in which the destination information output setting 115 is ON and the security function setting 114 is ENABLE, meaning that the operation of FIG. 6 passes through S105.

In the first disclosed embodiment discussed above with respect to FIG. 9, the receiver's name 127 and the destination 128 in the communication management report are printed with respect to only a communication history of the user ID "bc567890" as a sender. However, the first disclosed embodiment is not limited to this situation. Alternatively, when an email address and a facsimile number that are related to the user ID "bc567890" are registered in the MFP 100 in advance, the receiver's name 127 and the destination 128 in the communication management report may be printed with respect to the communication history of received facsimile and email document in which a destination is a user ID "bc567890." Further, the receiver's name 127 and the destination 128 in the communication management report may be printed with respect to the communication history containing received communications for the user ID "bc567890" and transmitted communications from the user ID "bc567890."

Regarding received emails in which several persons are receivers, when any of destinations, such as TO, CC (carbon copy), and BCC (blind carbon copy), contains an email address related to the user ID "bc567890," the receiver's name 127 and the destination 128 in the communication management report can be printed as the communication history containing received communications for the user ID "bc567890." In alternate embodiments, the security arrangement can be limited to a particular set of destinations, e.g., only TO, but not CC or BCC. Alternately, additional security levels could be provided, allowing different subsets of received communication to be included in the communication management report for these various security levels.

The communication history related only to the user ID "bc567890" can be printed as the communication management report.

As discussed above, in the first disclosed embodiment, when the destination information output setting 115 is OFF or the security function setting 114 is ENABLE, it is possible that the destination information, which should be hidden from a third person, is not printed in the communication management report. In the case where a transmission error exists when a logged-in user conducts to print the communication management report under the situation that the destination information output setting 115 is ON and the security function setting 114 is ENABLE, a sheet describing the transmission error is obvious. Therefore, it is easy to re-transmit the manuscript that was not previously transmitted because of the error.

Second Disclosed Embodiment

It is possible to observe/browse a communication management report through a user's computer according to a second disclosed embodiment. Therefore, a user can observe/browse the communication management report and confirm whether a transmission error is occurred without going to an MFP.

Figure 10:
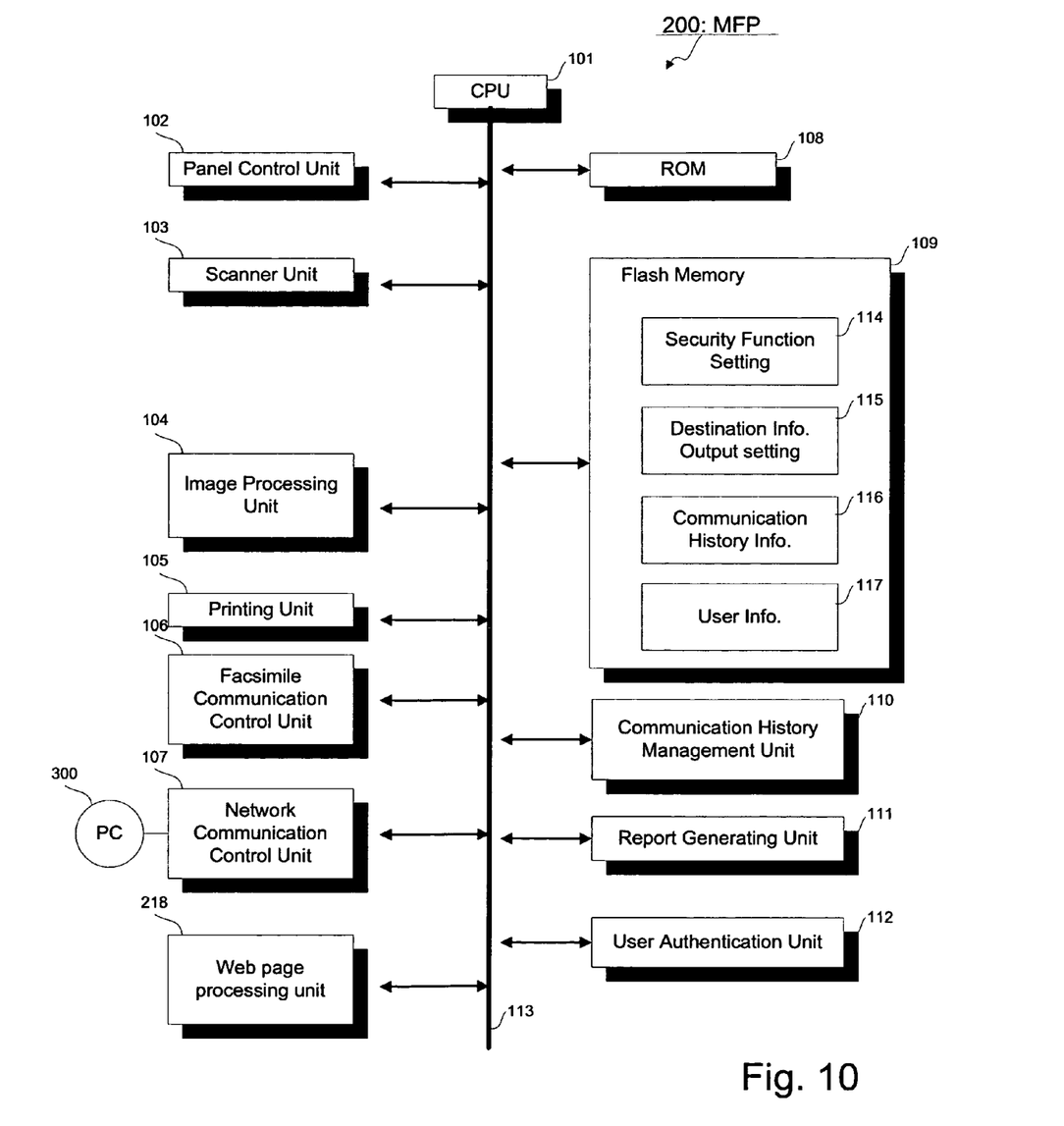
FIG. 10 is a functional block diagram of an MFP according to a second disclosed embodiment.

FIG. 10 is a functional block diagram of an MFP according to a second disclosed embodiment. An MFP 200 includes a CPU 101, a panel control unit 102, a scanner unit 103, an image processing unit 104, a printing unit 105, a facsimile communication control unit 106, a network communication control unit 107, a read only memory (ROM) 108, a flash memory 109, a communication history management unit 110, a report generating unit 111, a user authentication unit 112, and a system bus 113. The MFP according to the second disclosed embodiment further includes a web page processing unit 218. A user's computer (PC) 300 is connected to the network communication control unit 107 through a communication network or the like.

Portions that are different from the first disclosed embodiment are explained in detail. Elements that are substantially the same as the first disclosed embodiment have the same reference numeral as in the first disclosed embodiment and are not described in detail.

The web page processing unit 218 operates as an output part and has the following function: when a web browser of the PC 300 accesses the IP address of the MFP 200 through the network communication control unit 107, the web page processing unit 218 allows the PC 300 to observe/browse a setting menu of the MFP 200. When a user of the PC 300 requests the MFP 200 to observe/browse a communication management report through its web browser, the web page processing unit 218 generates a web page of the communication management report based on the data for the communication management report generated by a report generating unit 111 in the MFP 200 and sends information of the web page to the PC 300 through the network communication control unit 107. Therefore, the communication management report is displayed on the screen of the PC 300 through the user's web browser.

In addition, although element 300 is shown in the second disclosed embodiment as a personal computer, in alternate embodiments other alternate connection devices can be used. For example, element 300 could be a dumb network terminal, a mobile telephone, a personal digital assistant (PDA), another fax machine, a netbook, or any other device that can communicate over a network line and display data.

Figure 11:
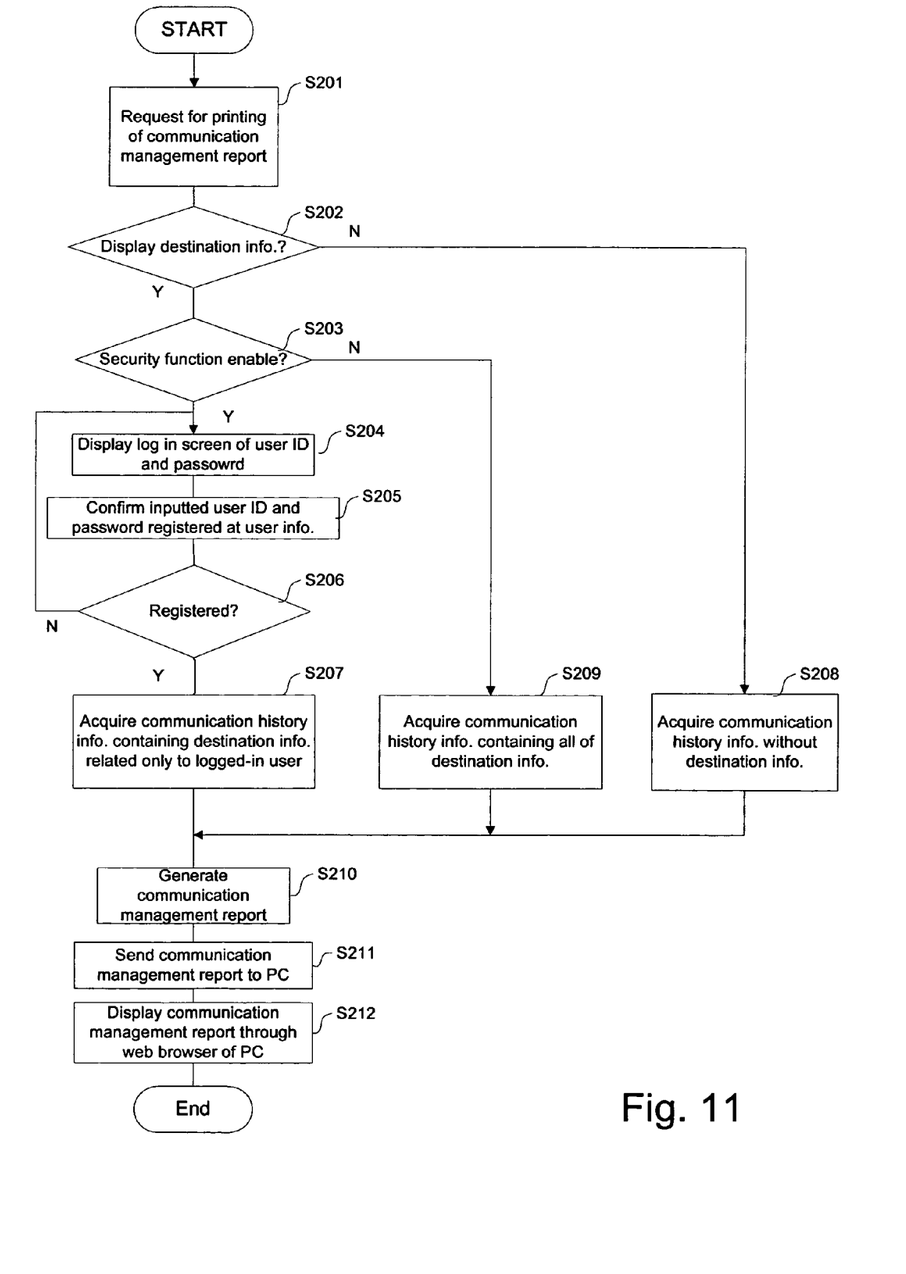
FIG. 11 is a flow diagram showing an operation that a communication management report of an MFP is browsed by a computer according to a second disclosed embodiment.

Next, an operation that a communication management report of the MFP 200 is observed/browsed by the PC 300 according to the second disclosed embodiment is explained below. FIG. 11 is a flow diagram showing an operation by which a communication management report of an MFP is browsed by a computer according to the second disclosed embodiment. An operation by which the communication management report of the MFP 200 is browsed by the PC 300 is explained below using steps S201 through S212 with reference to FIG. 11.

(S201) When a user requests that the MFP 200 observe/browse a communication management report by accessing the IP address of the MFP 200 through a web browser of the PC 300, the MFP 200 starts to generate the communication management report.

(S202) The CPU 101 instructs the system to read a destination information output setting 115 from the flash memory 109. When a state of the destination information output setting 115 is ON (i.e., all of the destination information is to be printed in the communication management report), the operation goes to S203. When a state of the destination information output setting 115 is OFF (i.e., all of the destination information is to be not printed in the communication management report), the operation goes to S208.

(S203) The CPU 101 instructs the system to read a destination information output setting 115 from the flash memory 109. When a state of the destination information output setting 115 is ON, the CPU 101 instructs the system to read a security function setting 114 from the flash memory 109. When a state of the security function setting 114 is ENABLE, the operation goes to S204. When a state of the security function setting 114 is DISABLE, the operation goes to S209.

(S204) When the security function setting 114 in the flash memory 109 is ENABLE, the CPU 101 instructs a web page processing unit 218 to generate a log-in input screen requesting a user ID and a password for a user who requests to browse a communication management report as authentication information, sends the generated screen to the PC 300 through the network communication control unit 107, and displays the log-in input screen through a web browser on the PC 300. This allows the device to authenticate the user's identity.

(S205) When a user inputs a user ID and a password through the web browser, the CPU 101 instructs a user authentication unit 112 to confirm whether the inputted user ID and password are registered in the user information 117.

(S206) When the inputted user ID and password are registered at the user information 117, the operation goes to S207. When the inputted user ID and password are not registered at the user information 117, an operation returns to the S204 for requesting the user to input the user ID and password again. Although not shown, the operation may exit after a wait time if no registered user logs in before the wait time expires. Alternately, the operation may exit after a specific number of failed attempts to log in are identified.

(S207) When the user's registration is confirmed, the CPU 101 instructs the communication history management unit 110 to acquire the following two types of communication history information 116 from the flash memory 109: (i) the communication history information 116 containing a receiver's name 127 and a destination 128 that the logged-in user transmitted, and (ii) the communication history information 116 not containing a receiver's name 127 and a destination 128 that a user other than the logged-in user transmitted.

(S208) In operation S202, when the destination information output setting 115 is OFF, the CPU 101 instructs the communication history management unit 110 to acquire the communication history information 116 that does not contain a receiver's name 127 and a destination 128 from the flash memory 109.

(S209) In operation S203, when the security function setting 114 is DISABLE, the CPU 101 instructs the communication history management unit 110 to acquire all of the communication history information 116 containing a receiver's name 127 and a destination 128 from the flash memory 109.

(S210) After receiving the relevant communication history information from the flash memory 109 in one of S207, S208, or S209, the communication history management unit 110 transfers the communication history information 116 acquired from the flash memory 109 to a report generating unit 111; and the report generating unit 111 generates data for a communication management report.

(S211) When the report generating unit 111 generates the data for the communication management report, the web page processing unit 218 generates a web page of the communication management report based on the data of the communication management report generated by the report generating unit 111 of the MFP 200, and sends information regarding the web page to the PC 300 through the network communication control unit 107.

(S212) When the generated information of the web page is sent to the PC 300 through the network communication control unit 107, the communication management report is displayed on the screen of the PC 300 through the web browser for a user.

The communication management report generated and displayed on the screen of the PC 300 is comparable to the printed communication management report that would be generated by the MFP 100. A communication management report in a destination information non-printing mode according to the second disclosed embodiment would be displayed as a web page in a format similar to that shown in FIG. 7. This corresponds to an exemplary embodiment in which the destination information output setting 115 is OFF, meaning that the operation of FIG. 11 passes through S208. A communication management report in a destination information printing and security function invalidity mode according to the second disclosed embodiment would be displayed as a web page in a format similar to that shown in FIG. 8. This corresponds to an exemplary embodiment in which the destination information output setting 115 is ON and the security function setting 114 is DISABLE, meaning that the operation of FIG. 11 passes through S209. And a communication management report in a destination information printing and security function validity mode according to the first disclosed embodiment would be displayed as a web page in a format similar to that shown in FIG. 9. This corresponds to an exemplary embodiment in which the destination information output setting 115 is ON and the security function setting 114 is ENABLE, meaning that the operation of FIG. 11 passes through S207.

As discussed above, in the present application, disclosed embodiments, such as a communication management report is printed or is browsed through a computer, are explained. However, the present application is not limited those disclosed embodiments. For example, it is possible that the communication management report is stored into a certain memory, or is transferred to a certain computer or a server.

As discussed above, it is possible to observe/browse a communication management report through a user's computer or other remote network viewing device according to the second disclosed embodiment. Therefore, a user can observe/browse the communication management report and confirm whether or not a transmission error is occurred without going to an MFP.

The present application is explained by applying it to an MFP as a communication terminal apparatus that is capable of transmitting a manuscript by facsimile or by email, and sending a file to a server. The present application can be applied to a facsimile machine and a network scanner.

What is claimed is:

1. A communication terminal apparatus comprising:
a communication history information part configured to store a plurality of communication histories, including at least destination information;
a report generating part configured to generate a communication management report including at least a portion of the plurality of the communication histories;
an output part configured to output the communication management report;
a destination information output setting part configured to set either a first condition, in which at least some of the destination information is included in the communication management report, or a second condition, in which none of the destination information is included in the communication management report;
a user information part configured to store first user information in advance;
a user authentication part configured to conduct an authentication of a user based on the first user information and second user information that has been input into the communication terminal apparatus by the user; and
a security function setting part configured to determine whether a security function is enabled, and to set either a third condition, in which the portion of the plurality of the communication histories included in the communication management report includes destination information relating to the user and users other than the user, if the security function is not enabled, or a fourth condition, in which the portion of the plurality of the communication histories included in the communication management report includes the destination information of only the user and not destination information relating to users other than the user, if the security function is enabled, wherein
when the first condition is set at the destination information output setting part, and when the third condition is set at the security function setting part, the report generating part generates, without the authentication of the user, the communication management report such that the portion of the plurality of the communication histories included in the communication management report includes all of the destination information,
when the first condition is set at the destination information output setting part, and when the fourth condition is set at the security function setting part, the report generating part generates, upon the authentication of the user, the communication management report such that the portion of the plurality of the communication histories included in the communication management report includes only a portion of the destination information associated with a portion of the communication histories relating to the user,
only when the second condition is set at the destination information output setting part, the portion of the plurality of the communication histories included in the communication management report includes none of the destination information.

2. The communication terminal apparatus according to claim 1, wherein
the communication management report is displayed at a host device that is connected to the communication terminal apparatus through a communication network.

3. The communication terminal apparatus according to claim 2, further comprising,
a web page processing unit displaying the communication management report through a web browser on the host device.

4. The communication terminal apparatus according to claim 2, wherein
the communication network is the Internet.

5. The communication terminal apparatus according to claim 1, wherein
the output part includes a printing unit configured to output the communication management report in a printed format.

6. The communication terminal apparatus according to claim 1,
the first user information includes a first user identification information and a first password that is associated with the first user identification information,
the second user information includes a second user identification information and a second password that is associated with the second user identification information, and
the user authentication part conducts the authentication of the user by respectively comparing the second user identification information and the second password with the first user identification information and the first password.

7. A method of operating a communication terminal apparatus, comprising:
receiving a request for outputting a communication management report including at least a portion of communication history information relating to one or more data communications, the communication history information including destination information for each of the one or more data communications;
authenticating a user based on stored first user information and second user information that has been input into the communication terminal apparatus by the user;
determining whether a first condition occurs, in which the portion of the communication history information included in the communication management report includes at least some of the destination information, or whether a second condition occurs, in which none of the destination information is included in the communication management report;
determining whether a security function is enabled;
if the security function is not enabled, setting a third condition, in which the portion of the communication history information included in the communication management report includes destination information relating to the user and users other than the user;
if the security function is enabled, setting a fourth condition, in which the portion of the communication history information included in the communication management report includes the destination information of only the user and does not include destination information relating to users other than the user;
acquiring the portion of the communication history information included in the communication management report from a memory element, including any portion of the destination information that has been determined to be included in the communication management report;

generating the communication management report based on the acquired communication history information; and outputting the communication management report using an output part, wherein when it is determined that the first condition occurs and it is determined that the third condition occurs, the generating of the communication management report is performed, without the authentication of the user, such that the communication management report includes all of the destination information, when it is determined that the first condition occurs and it is determined that the fourth condition occurs, the generating of the communication management report is performed, upon the authentication of the user, such that the communication management report includes only a portion of the destination information associated with the user, only when it is determined that the second condition occurs, the generating of the communication management report is performed such that the communication management report includes none of the destination information.

8. The method of operating a communication terminal apparatus of claim 7, wherein the outputting comprises:

physically printing the communication management report.

9. The method of operating a communication terminal apparatus of claim 7, wherein the outputting comprises:

electronically sending the communication management report to a remote device; and displaying the communication management report on the remote device.

10. The method of operating a communication terminal apparatus of claim 9, wherein the remote device is a computer, and wherein the displaying of the communication management report is performed using a web browser on the computer.

11. The method of operating a communication terminal apparatus of claim 9, wherein the remote device is one of a mobile telephone, a personal digital assistant, a fax machine, and a netbook.

* * * * *